United States Patent
Fujiwara (10) Patent No.: US 8,398,312 B2
(45) Date of Patent: Mar. 19, 2013

(54) ROLLER BEARING WITH CROWNING

(75) Inventor: Hiroki Fujiwara, Kuwana (JP)

(73) Assignee: NTN Corporation, Osaka (JP)

( * ) Notice: Subject to any disclaimer, the term of this patent is extended or adjusted under 35 U.S.C. 154(b) by 135 days.

(21) Appl. No.: 12/447,032

(22) PCT Filed: Oct. 30, 2007

(86) PCT No.: PCT/JP2007/071083
§ 371 (c)(1),
(2), (4) Date: Apr. 24, 2009

(87) PCT Pub. No.: WO2008/056563
PCT Pub. Date: May 15, 2008

(65) Prior Publication Data
US 2010/0027932 A1   Feb. 4, 2010

(30) Foreign Application Priority Data

Nov. 10, 2006 (JP) .................................. 2006-305426
Nov. 15, 2006 (JP) .................................. 2006-309598

(51) Int. Cl.
F16C 33/34 (2006.01)
(52) U.S. Cl. ........................................................ 384/568
(58) Field of Classification Search .................. 384/548, 384/560, 565, 568, 618, 619, 622
See application file for complete search history.

(56) References Cited

U.S. PATENT DOCUMENTS

| | | | | |
|---|---|---|---|---|
| 3,740,108 A * | 6/1973 | Fernlund | ..................... | 384/564 |
| 4,027,930 A * | 6/1977 | Bodensieck | .................. | 384/556 |
| 4,557,613 A * | 12/1985 | Tallian et al. | ................. | 384/568 |
| 6,261,203 B1 * | 7/2001 | Shimizuya et al. | ............. | 476/40 |
| 6,311,660 B1 * | 11/2001 | Sahara et al. | ............. | 123/90.42 |
| 6,315,458 B1 * | 11/2001 | Unno et al. | .................... | 384/565 |
| 6,328,477 B1 * | 12/2001 | Tsujimoto et al. | ............ | 384/450 |
| 6,354,745 B1 * | 3/2002 | Ai | ................................. | 384/565 |
| 6,390,685 B1 * | 5/2002 | Shimomura et al. | ......... | 384/568 |

(Continued)

FOREIGN PATENT DOCUMENTS

| | | |
|---|---|---|
| JP | 2001-65574 | 3/2001 |
| JP | 2001-124089 | 5/2001 |

(Continued)

OTHER PUBLICATIONS

International Search Report mailed Feb. 5, 2008 for International Application No. PCT/JP2007/071083.

(Continued)

*Primary Examiner* — Thomas R Hannon
(74) *Attorney, Agent, or Firm* — Wenderoth, Lind & Ponack, L.L.P.

(57) ABSTRACT

A roller bearing includes: an inner ring having an inner ring raceway; an outer ring having an outer ring raceway; and a plurality of rollers interposed between the inner ring raceway and an outer ring raceway, wherein a crowning is formed on at least one of the inner ring raceway, the outer ring raceway, and a roller rolling contact surface, wherein an optimal value of a drop amount of the crowning at an end of an effective length is determined, from a diameter of a roller and an effective length of the roller, and wherein drop amounts of the crowning at a plurality of positions in a bus-line direction of the crowning are within an allowable range set forth in a specific table.

1 Claim, 7 Drawing Sheets

U.S. PATENT DOCUMENTS

| | | | |
|---|---|---|---|
| 6,997,617 B2 | 2/2006 | Ide et al. | |
| 7,488,113 B2 * | 2/2009 | Takemura | 384/568 |
| 2002/0176642 A1 * | 11/2002 | Takemura | 384/568 |
| 2004/0240764 A1 | 12/2004 | Ide et al. | |
| 2006/0013520 A1 * | 1/2006 | Tamada et al. | 384/565 |
| 2009/0169145 A1 * | 7/2009 | Obayashi et al. | 384/450 |

FOREIGN PATENT DOCUMENTS

| | | |
|---|---|---|
| JP | 2004-353744 | 12/2004 |
| JP | 3731401 | 10/2005 |
| JP | 2006-52790 | 2/2006 |

OTHER PUBLICATIONS

Supplementary European Search Report dated Dec. 7, 2009 in corresponding European Application No. 07830817.

Hiroki Fujiwara and Tatsuo Kawase, "Logarithmic Profile of Rollers in Roller Bearing and Optimization of the Profile", Transactions of the Japan Society of Mechanical Engineers C, vol. 72, No. 721, Sep. 25, 2006, pp. 338-345.

Von G. Lundberg, "Elastic Contact Between Two Semi-Infinite Bodies", Forschung auf den Gebiete des Ingenieurwesen, 5 (1939), pp. 201-211.

P.M. Johns and R. Gohar, "Roller Bearing Under Radial and Eccentric Loads", Tribology International, 14 (1981), pp. 131-136.

International Preliminary Report on Patentability and Written Opinion of the International Searching Authority dated May 26, 2009 for International Application No. PCT/JP2007/071083.

* cited by examiner

DIAGRAM OF RELATIONSHIP BETWEEN NOMINAL DIMENSION AND DROP AMOUNT

FIG. 4

DIAGRAM OF RELATIONSHIP BETWEEN LOAD PERCENTAGE AND CONSTANTS IN REGRESSION EQUATION OF $Z_m$

FIG. 5A

DIAGRAM OF DIMENSIONLESS CROWNING CURVE AT DESIGN LOAD OF 25%Cr

FIG. 5B

DIAGRAM OF DIMENSIONLESS CROWNING CURVE AT DESIGN LOAD OF 30%Cr

FIG. 5C

DIAGRAM OF DIMENSIONLESS CROWNING CURVE AT DESIGN LOAD OF 35%Cr

FIG. 5D

DIAGRAM OF DIMENSIONLESS CROWNING CURVE AT DESIGN LOAD OF 40%Cr

FIG. 5E

DIAGRAM OF DIMENSIONLESS CROWNING CURVE AT DESIGN LOAD OF 50%Cr

FIG. 6

DIAGRAM OF MAXIMUM VALUE AND MINIMUM VALUE OF DIMENSIONLESS CROWNING AT DESIGN LOADS OF 25%Cr TO 50%Cr

FIG. 7

DIAGRAM OF DISTRIBUTION OF MAXIMUM VALUE OF MISES' EQUIVALENT STRESS

FIG. 8

ROLLER BEARING WITH CROWNING

BACKGROUND OF THE INVENTION

1. Field of the Invention

The present invention relates to a roller bearing in which a crowning is formed on at least one of an inner ring raceway, an outer ring raceway, and a roller rolling contact surface, and a method of designing the crowning.

2. Description of Related Art

In a roller bearing, a crowning is conventionally formed on an outer ring raceway, an inner ring raceway, and a roller rolling contact surface. An edge load applied to end sections of the contacting sections between the raceways and the rolling contact surface is prevented, thereby extending the fatigue life of the roller bearing.

A curved line expressed by a logarithmic function is used for a profile of the crowning formed in the roller bearing. A function proposed by Lundberg is widely known as the crowning curve expressed by a logarithmic function (refer to Non-patent Document 1: Lundberg, G, Elastic Contact Between Two Semi-Infinite Bodies, Forschung auf den Gebiete des Ingenieurwesen, 5[1939], pp. 201-211). A function proposed by Johns-Gohar (refer to Non-patent Document 2: Johns, P. M. and Gohar, R., Roller bearing under radial and eccentric loads, Tribology International, 14[1981], pp. 131-136) is known as a practical modification of the crowning curve.

However, in the crowning curve based on the Johns-Gohar function, contact pressure is slightly high between the raceways and the rolling contact surface at end sections of a crowning forming section. The edge load cannot be sufficiently prevented.

Therefore, the inventors of the present invention have proposed a crowning curve in which new design parameters are introduced to the Johns-Gohar function to achieve uniformity in the contact pressure placed between the raceways and the rolling contact surface (refer to Patent Document 1: Japanese Patent Laid-Open Publication No. 2006-52790). In the design of a roller bearing to which the crowning curve is applied, a fraction size and an initial value search range of the above-mentioned design parameters are determined. Then, an objective function is determined for a combination of design parameters obtained by the initial value search range and the fraction size. A combination of design parameters of which the objective function is optimal is used as initial values. The initial values are further strictly optimized by a mathematical optimization technique, and the crowning curve is determined. The crowning formed in the roller bearing is thus designed. Another crowning curve is proposed in Patent Document 2.

Non-patent Document 1: Lundberg, G, Elastic Contact Between Two Semi-Infinite Bodies, Forschung auf den Gebiete des Ingenieurwesen, 5 (1939), pp. 201-211

Non-patent Document 2: Johns, P. M. and Gohar, R., Roller bearing under radial and eccentric loads, Tribology International, 14 (1981), pp. 131-136

Patent Document 1: Japanese Patent Laid-Open Publication No. 2006-52790

Patent Document 2: Japanese Patent Publication No. 3731401

BRIEF SUMMARY OF THE INVENTION

Problems to be Solved by the Invention

In the above-described conventional roller bearing, inspection of the crowning during product inspection requires a significant amount of labor. Specifically, in the conventional roller bearing, because the design parameters of the crowning curve are determined by optimization calculation, tolerance is set for the design parameters. Therefore, to inspect the crowning, a bus line profile on which the crowning is formed is required to be measured. Then, the design parameters are required to be calculated from the measured data. Whether the calculated values of the design parameters are within the range of tolerance is required to be judged. In terms of man-hours, these operations cannot realistically be performed on an actual production line.

Therefore, a first object of the present invention is to provide a roller bearing that facilitates inspection of a crowning.

In a method of designing the crowning in the conventional roller bearing, a computer performs the optimization calculation for determining the initial values of the design parameters. However, the optimization calculation requires an enormous amount of calculation regarding conditions included in the initial value search range of the design parameters. Therefore, the above-described conventional design method is extremely time-consuming and labor-intensive.

Therefore, a second object of the present invention is to provide a method of designing a crowning in a roller bearing in which time and labor required for designing can be significantly reduced.

Means for Solving the Problems

To solve the above-described issues, a roller bearing according to a first aspect of the invention includes a plurality of rollers interposed between an inner ring raceway and an outer ring raceway. A crowning is formed on at least one of the inner ring raceway, the outer ring raceway, and a roller rolling contact surface. An optimal value $z_m[\mu m]$ of a drop amount of the crowning at an end of an effective length, a diameter $d[mm]$ of a roller, and an effective length $L[mm]$ of the roller satisfy Expression (3), below. Drop amounts of the crowning at a plurality of positions in a bus-line direction of the crowning are within an allowable range in Table 1, below.

[Expression 3]

$$0.40(d+L)+0.66 \leq z_m \leq 0.46(d+L)+1.03 \qquad (3)$$

TABLE 1

| Bus-line Direction Position (Dimensionless Amount) | Allowable Range of Drop Amount (Dimensionless Amount) |
|---|---|
| ±0.7 | 0~0.1 |
| ±0.9 | 0.6~0.8 |
| ±1.0 | 1.25~1.75 |

When the inventors of the present invention performed optimization calculation of an objective function using predetermined design parameters for a crowning curve expressed by a conventional logarithmic function, the inventors discovered that a correlation is present between a nominal dimension and a design load of the roller and the drop amount of the crowning at the end of the effective length of the roller. The present invention has been achieved based on this discovery.

In other words, a relationship such as that shown in Expression (4) can be obtained from results of optimization calculation of objective functions performed with a plurality of load conditions being set, regarding roller bearings having a plurality of dimensions.

[Expression 4]

$$z_m = (0.0051x + 0.2721) \cdot (d+L) + (0.0415x - 0.3443) \quad (4)$$

where, $z_m[\mu m]$ indicates an optimal value of the drop amount of the crowning at the end of the effective length of the roller, $x[\%]$ indicates a percentage of the design load to a basic dynamic load rating, $d[mm]$ indicates the diameter of the roller, and $L[mm]$ indicates the effective length.

Here, under actual usage conditions, the percentage of the design load to the basic dynamic load rating rarely exceeds 35%. On the other hand, when the percentage of the design load is lower than 25%, prevention of the edge load becomes insufficient. Therefore, in Expression (4), when the range of the value of x is 25 or more and 35 or less, the drop amount of the crowning at the end of the effective length of the roller is appropriate for actual usage conditions. In other words, when the optimal value $z_m[\mu m]$ of the drop amount at the end of the effective length of the roller, the diameter $d[mm]$ of the roller, and the effective length $L[mm]$ of the roller satisfy Expression (4), a crowning having these values is judged to be suitable for actual use.

Moreover, regarding the drop amounts of the crowning at a plurality of positions in the bus-line direction, an allowable range of a drop amount in which, as a result of a rate of increase of Mises' equivalent stress being calculated with error being given to the drop amounts, the rate of increase in the equivalent stress is a predetermined value or less is as shown in Table 1, above. In Table 1, a value of the bus-line direction position is a value made dimensionless by a value (L/2) that is half of the effective length of the roller. A center of the effective length of the roller is zero. A value of the allowable range of the drop amount is a value made dimensionless by the optimal value ($z_m$) of the drop amount at the end of the effective length of the roller. When the drop amount of the crowning in the bus-line direction position is within the allowable range, the dimensions of the crowning can be judged to be within a tolerance range. Therefore, in the roller bearing of the present invention, unlike a conventional roller bearing, it is not required for a crowning profile to be measured and design parameters to be calculated. Therefore, inspection of the crowning can be more easily performed than in the conventional roller bearing.

In a method of designing a crowning in a roller bearing according to a second aspect, in a roller bearing including a plurality of rollers interposed between an inner ring raceway and an outer ring raceway, a crowning is formed on at least one of the inner ring raceway, the outer ring raceway, and a roller rolling contact surface. In the method, a drop amount of the crowning at an end of an effective length of a roller is determined based on a nominal dimension and a design load of the roller. The drop amount at the end of the effective length of the roller is applied to a table indicating a plurality of drop amounts corresponding to a plurality of positions in a bus-line direction in dimensionless amounts, and a plurality of drop amounts at a plurality of positions in the bus-line direction are determined. From the determined plurality of drop amounts, a profile line of the crowning formed on at least one of the inner ring raceway, the outer ring raceway, and the roller rolling contact surface is determined.

When the inventors of the present invention performed optimization calculation of an objective function using predetermined design parameters for a crowning curve expressed by a conventional logarithmic function, the inventors discovered that a correlation is present between a nominal dimension and a design load of the roller and the drop amount of the crowning at the end of the effective length of the roller. The present invention has been achieved based on this discovery.

In the invention according to the second aspect, the drop amount of the crowning at the end of the effective length of the roller is determined based on the nominal dimension and the design load of the roller. As a result of the drop amount at the end of the effective length of the roller being applied to the table, a plurality of drop amounts at a plurality of positions in the bus-line direction can be determined. From the determined plurality of drop amounts, the profile line of the crowning formed on at least one of the inner ring raceway, the outer ring raceway, and the roller rolling contact surface can be determined. In this way, in the present invention, optimization calculation is not required to be performed on the values of a large number of parameters. Therefore, time and labor required to design the crowning in the roller bearing can be significantly reduced from that required conventionally.

The drop amount of the crowning refers to a distance from a bus line of the raceway or the rolling contact surface on which the crowning is formed to a crowning surface, in a direction perpendicular to the bus line.

A third aspect of the invention is the method of designing a crowning in a roller bearing according to the second aspect, in which the drop amount of the crowning at the end of the effective length of the roller is determined using Expression (5), below.

[Expression 5]

$$z_m = (0.0051x + 0.2721) \cdot (d+L) + (0.0415x - 0.3443) \quad (5)$$

where, $z_m[\mu m]$ indicates the drop amount of the crowning at the end of the effective length of the roller, $x[\%]$ indicates a percentage of the design load to a basic dynamic load rating, $d[mm]$ indicates a diameter of the roller, and $L[mm]$ indicates the effective length.

According to the third aspect of the invention, the drop amount $z_m$ of the crowning at the end of the effective length of the roller can be easily obtained simply by a sum of the diameter d and the effective length L being substituted for the nominal dimension, and the percentage x of the design load to the basic dynamic load rating being substituted for the design load.

A fourth aspect of the invention is the method of designing a crowning in a roller bearing according to the second aspect, in which the table includes values in Table 2, below.

TABLE 2

| Bus-line Direction Position (Dimensionless Amount) | Drop Amount (Dimensionless Amount) |
|---|---|
| 0–0.50 | 0 |
| 0.55 | 0.002 |
| 0.60 | 0.015 |
| 0.65 | 0.043 |
| 0.70 | 0.086 |
| 0.75 | 0.147 |
| 0.80 | 0.229 |
| 0.85 | 0.340 |
| 0.90 | 0.489 |
| 0.95 | 0.696 |
| 1.00 | 1.000 |

According to the fourth aspect of the invention, the drop amount at each bus-line direction position can be determined simply by the drop amount at the end of the effective length of the roller being multiplied with a dimensionless value of the drop amount in Table 2.

In Table 2, the value of the bus-line direction position is a value made dimensionless by a value (L/2) that is half of the effective length of the roller. The value of the drop amount is a value made dimensionless by the drop amount ($z_m$) at the end of the effective length of the roller.

A fifth aspect of the invention is the method of designing a crowning in a roller bearing according to the third aspect, in which the drop amount of the crowning at the end of the effective length of the roller is determined with a value of x in Expression (5) above being 25 or more and 35 or less.

According to the fifth aspect of the invention, a crowning curve that corresponds to actual usage conditions of the roller bearing can be designed. Here, when the value of x is less than 25, the crowning curve cannot sufficiently prevent edge load. On the other hand, when the value of x is greater than 35, an amount of processing required to manufacture the crowning increases, and manufacturing costs increase.

A sixth aspect of the invention is the method of designing a crowning in a roller bearing according the second aspect, in which the determined plurality of drop amounts are distributed to be drop amounts of the inner ring raceway or the outer ring raceway, and drop amounts of the roller rolling contact surface. Profile lines of crownings formed on the inner ring raceway or the outer ring raceway, and the roller rolling contact surface are determined.

According to the sixth aspect of the invention, the determined plurality of drop amounts are distributed in each position in the bus-line direction to be the drop amounts of the inner ring raceway or the outer ring raceway, and the drop amounts of the roller rolling contact surface. From the distributed drop amounts, the profile line of the crowning formed on the inner ring raceway or the outer ring raceway and the profile line of the crowning formed on the roller rolling contact surface can be determined. As a result, the crownings formed on both the inner ring raceway or the outer ring raceway, and the roller rolling contact surface can be designed.

Advantage of the Invention

In the roller bearing of the present invention, a crowning is formed on at least one of the inner ring raceway, the outer ring raceway, and the roller rolling contact surface. When the optimal value $z_m$[µm] of the drop amount of the crowning at the end of the effective length, the diameter d[mm] of the roller, and the effective length L[mm] of the roller satisfy a predetermined expression, and the drop amounts of the crowning at a plurality of bus-line direction positions of the crowning are within a predetermined allowable range, the crowning can be judged to be suitable for preventing edge load. Therefore, in the roller bearing of the present invention, inspection of the crowning can be more easily performed than in a conventional roller bearing.

In the method of designing of the present invention, the drop amount of the crowning at the end of the effective length is determined based on the nominal dimension and the design load of the roller. The drop amount applied to a predetermined dimensionless table, and the profile line of the crowning is determined. Therefore, optimization calculation for values of a large number of parameters is not required to be performed. As a result, time and labor required to design the crowning in the rolling bearing can be significantly reduced.

DETAILED DESCRIPTION OF THE INVENTION

An embodiment of a roller bearing and a method of designing a crowning of the present invention will be hereinafter described in detail, with reference to the accompanying drawings.

Figure 1:
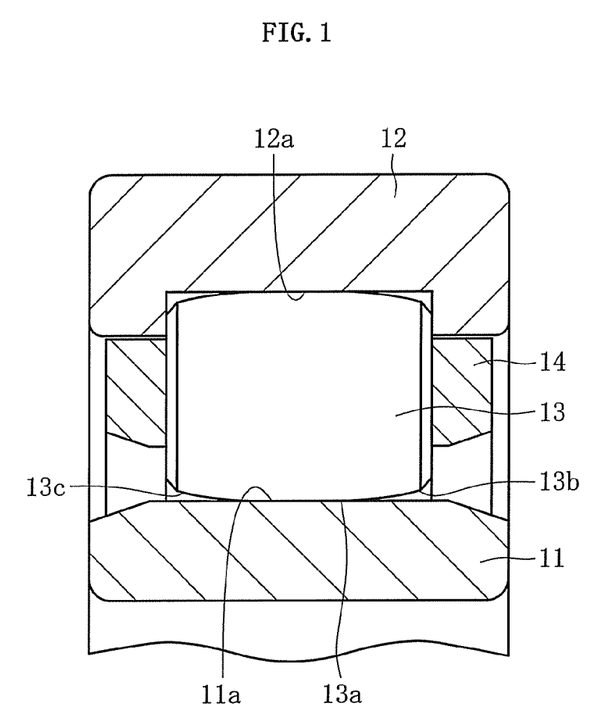
FIG. 1 is a cross-sectional view of a cylindrical roller bearing according to an embodiment of the present invention.

FIG. 1 is a cross-sectional view of a cylindrical roller bearing according to the embodiment of the present invention. As shown in FIG. 1, the cylindrical roller bearing includes an inner ring 11, an outer ring 12, a plurality of cylindrical rollers 13, and a cage 14. The cylindrical rollers 13 are interposed between an inner ring raceway 11a and an outer ring raceway 12a, such as to roll freely. The cage 14 holds the cylindrical rollers 12 with a predetermined amount of space therebetween in a circumferential direction of the cylindrical roller bearing. According to the embodiment, cut crownings 13b and 13c are provided on a rolling contact surface 13a of each cylindrical roller 13. The raceway 11a of the inner ring 11 and the raceway 12a of the outer ring 12 are each formed into a cylindrical surface.

Figure 2:
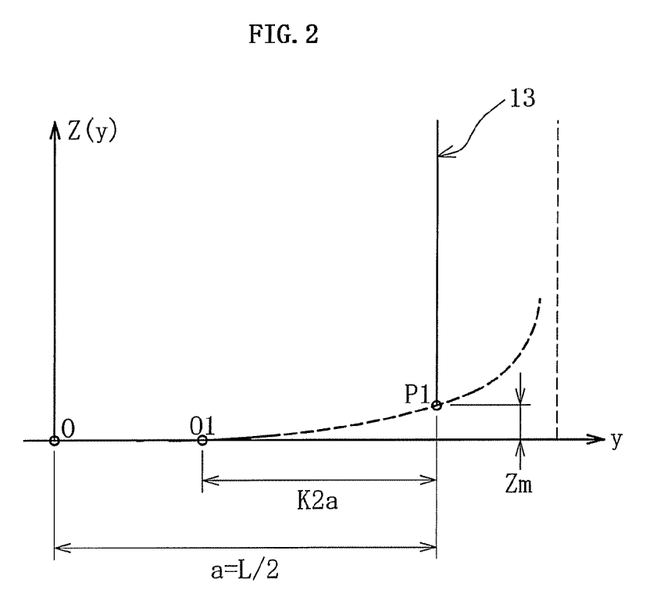
FIG. 2 is a diagram of a profile of a crowning formed on a cylindrical roller shown on a y-z coordinate system.

FIG. 2 is a diagram of the crowning provided on the cylindrical roller 13, shown on a y-z coordinate system in which an extending direction of a bus line of the cylindrical roller 13 is a y axis and a direction perpendicular to the bus line (radial direction of the roller) is a z axis. The y-z coordinate system is on the bus line of the cylindrical roller 13. A center of an effective contacting section between the inner ring 11 or the outer ring 12, and the cylindrical roller 13 serves as a point of origin O. The effective contacting section refers to a contacting region between the inner ring 11 or the outer ring 12 and the cylindrical roller 13 under an assumption that the cut crownings 13b and 13c are not formed on the cylindrical roller 13. The crowning 13b and the crowning 13c formed on the cylindrical roller 13 are ordinarily formed in a linearly symmetrical manner in relation to the z axis passing through the center of the effective contacting section. Therefore, only one of the crownings, the crowning 13b, is shown in FIG. 2.

The crowning 13b can be expressed as shown in Expression (6), below, using a logarithmic function.

[Expression 6]

$$z(y) = K_1 A \ln \frac{1}{1 - \left\{1 - \exp\left(-\frac{z_m}{K_1 A}\right)\right\} \left(\frac{y-a}{K_2 a} + 1\right)^2} \quad (6)$$

where, $K_1$ is a parameter indicating a degree of curvature of the crowning. A is expressed by $2Q/\pi LE'$. Q indicates load. L indicates a length of the effective contacting section in the bus-line direction. E' indicates an equivalent elastic modulus. Moreover, $z_m$ indicates an optimal value of a drop amount of the crowning at an end of an effective length of the roller, and refers to an optimal value of a maximum drop amount of the crowning 13b. Point $P_1$ in FIG. 2 is a position indicating the optimal value $z_m$ of the maximum drop amount of the crowning 13b. Furthermore, a indicates a length from the point of origin O to the end of the effective contacting section. $K_2$ is a parameter indicating a percentage of crowning length in relation to the above-described a. In the crowning 13b in FIG. 2, because the point of origin O is at the center of the effective contacting section, a=L/2. Because coordinates of a starting point $O_1$ of the crowning 13b is $(a-K_2a,0)$, the range of y in Expression (6) is $y>(a-K_2a)$.

In Expression (6), z(y) is an amount of drop in the crowning 13b at a bus-line direction position y in the cylindrical roller 13. In Expression (6), the values of Q, L, E', and a are provided as design conditions. An area from the point of origin O to the starting point $O_1$ of the crowning 13b is a straight section formed into a cylindrical surface. Therefore, when $0 \leq y \leq (a-K_2a)$, z(y)=0. When $K_2=1$, the starting point $O_1$ matches the point of origin O. Therefore, Expression (6) expresses a full-crowning in which no straight section is formed.

In the conventional roller bearing and method of designing the crowning, the crowning curve is determined by the design conditions, such as the load Q, and appropriate design parameters $K_1$, $K_2$, and $z_m$ being provided to Expression (6). To determine the design parameters $K_1$, $K_2$, and $z_m$, optimization calculation of an objective function is performed within a possible range of each parameter. Therefore, a large amount of optimization calculation is required to be performed for each cylindrical roller bearing being designed, thereby requiring vast amounts of labor and time.

On the other hand, according to the embodiment, the optimal value $z_m$ of the drop amount of the crowning at the end of the effective length of the roller, described above, is determined using a function in which a nominal dimension and a design load of the roller are variables. The optimal value $z_m$ of the drop amount is applied to a predetermined table, thereby determining a profile of an overall crowning.

The above-described function is determined as described below.

First, the above-described parameters are optimized by a mathematical optimization technique. When the roller is tilted during optimization of the parameters, $K_2=1$ under most conditions. Surface pressure or Mises' equivalent stress decreases as the crowning becomes closer to a full-crowning. However, for manufacturing-related reasons, the cylindrical roller preferably has a straight section over at least 50% of the overall length. Therefore, according to the embodiment, rather than being optimized, $K_2$ is fixed such that the straight section covers 50% of the overall length.

Next, regarding a roller having a dimension of ($\phi 5 \times 5$ to $\phi 24 \times 38$, optimization calculation of the crowning curve is performed in a manner similar to that in the conventional method. As the objective function for optimization, a maximum value of Mises' equivalent stress near the contacting section is used. Regarding design conditions, a tilt of the roller is $1/1000$ (a value equivalent to $2/1000$ in terms of misalignment between the inner ring and the outer ring). A design load is set for contact load between a single roller and the inner ring. The contact load is set to a maximum rolling body load of when load acting on the bearing is 25% or more and 50% or less of a basic dynamic load rating Cr. Hereafter, design conditions in which the design load is the maximum rolling body load of when a load that is x % of the basic dynamic load rating Cr is applied to the bearing is referred to as an x % Cr design. As the objective function for optimization, at least one of the maximum contact pressure applied to the inner ring raceway, the outer ring raceway or the roller rolling contact surface, a maximum value of Mises' equivalent stress, a maximum value of Tresca's equivalent stress, and rolling fatigue life can be used. When the maximum contact pressure, the maximum value of Mises' equivalent stress, or the maximum value of Tresca's equivalent stress is used as the objective function, the design parameters are set such that these values are minimized. When the rolling fatigue life is used as the objective function, the design parameters are set such that the rolling fatigue life is maximized.

Figure 3:
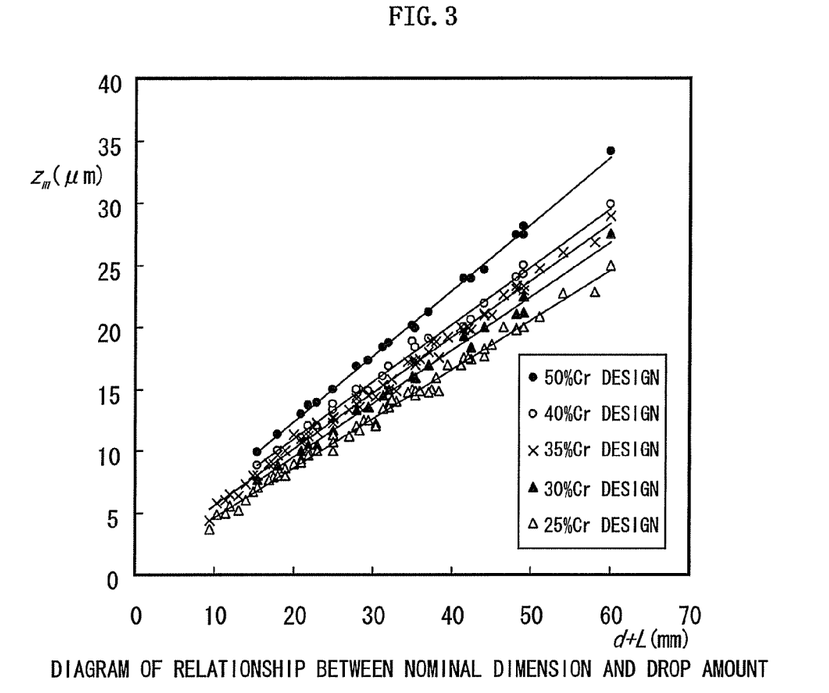
FIG. 3 is a diagram of a drop amount $z_m$ at an end of an effective length, extracted from optimization calculation results.

FIG. 3 is a diagram showing calculation results of the optimal value $z_m$ of the drop amount at the end of the effective length extracted from the results of optimization performed using Mises' equivalent stress as the objective function regarding each design condition. In FIG. 3, the horizontal axis is a sum of the diameter d(mm) and the effective length L(mm) of the roller. The vertical axis is the optimal value $z_m$(μm) of the drop amount at the end of the effective length. In FIG. 3, the optimization results of rollers having 64 types of dimensions with a diameter of $\phi 24$ and below are shown regarding a 25% Cr design and a 35% Cr design. Regarding a 30% Cr design, a 40% Cr design, and a 50% Cr design, the optimization results for 20 types of dimensions, among the 64 types of dimensions with a diameter of $\phi 24$ and below, are extracted and shown. As is clear from FIG. 3, under any load condition, a linear relationship of which a correlation coefficient is 0.997 or more is present between the sum of the dimension d and the effective length L of the roller, and the optimal value $z_m$ of the drop amount at the end of the effective length.

From the calculation results shown in FIG. 3, a relationship between (d+L)[mm] and $z_m$[μm] under each load condition is as shown in Expression (7) to Expression (11), below.

[Expression 7]

$$z_m = 0.3983(d+L) + 0.6600 \quad (7)$$

[Expression 8]

$$z_m = 0.4313(d+L) + 0.8945 \quad (8)$$

[Expression 9]

$$z_m = 0.4560(d+L) + 1.0270 \quad (9)$$

[Expression 10]

$$z_m = 0.4654(d+L) + 1.5259 \quad (10)$$

[Expression 11]

$$z_m = 0.5330(d+L) + 1.6352 \quad (11)$$

Here, Expression (7) is the 25% Cr design. Expression (8) is the 30% Cr design. Expression (9) is the 35% Cr design. Expression (10) is the 40% Cr design. Expression (11) is the 50% Cr design.

Moreover, when constant parts a and b of when the above-described Expression (7) to Expression (11) are generalized in the form of $z_m = a(d+L) + b$ are considered to have a linear relationship with the load, a and b can be approximated as shown in Expression (12) and Expression (13), below.

[Expression 12]

$$a = 0.0051x + 0.2721 \quad (12)$$

[Expression 11]

$$b = 0.0415x + 0.3443 \quad (13)$$

Figure 4:
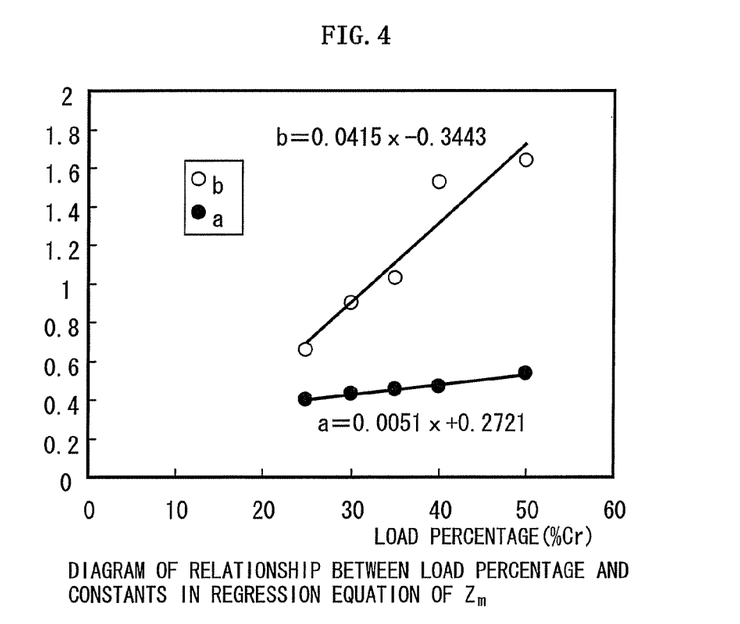
FIG. 4 is a diagram of a relationship between constants a and b in a generalized expression of the drop amount $z_m$ at the end of the effective length, and a percentage x of a design load in relation to a basic dynamic load rating.
Figure 5A:
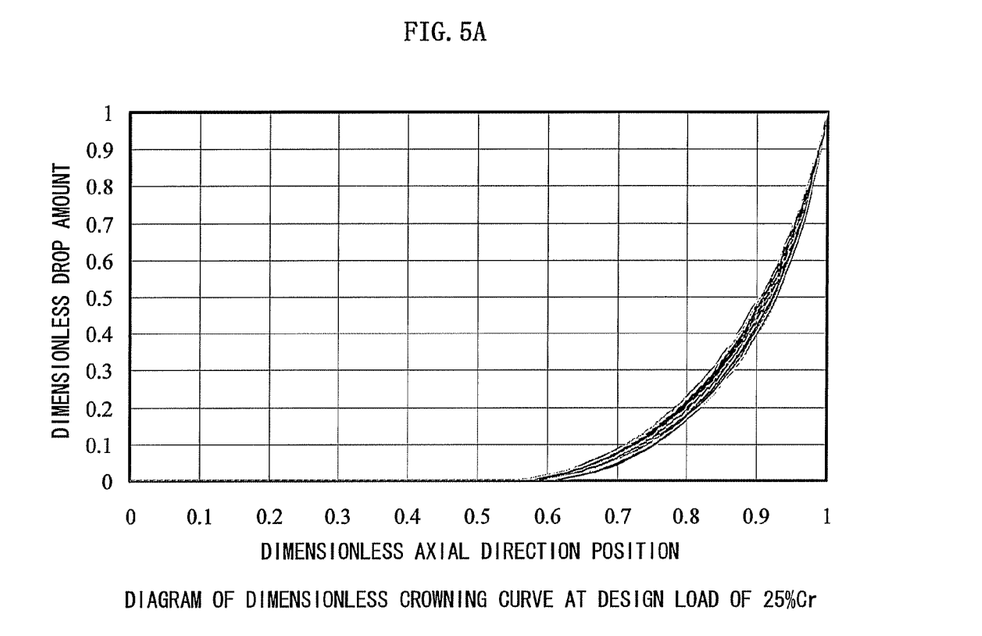
FIG. 5A is a diagram of optimization results of a crowning profile when the design load is 25% of the basic dynamic load rating.
Figure 5B:
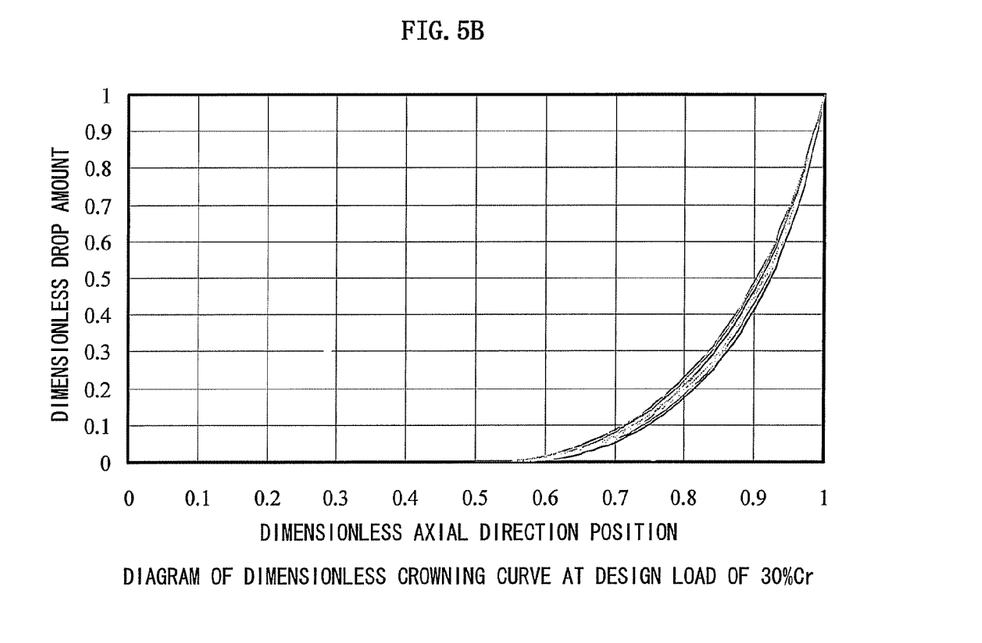
FIG. 5B is a diagram of optimization results of a crowning profile when the design load is 30% of the basic dynamic load rating.
Figure 5C:
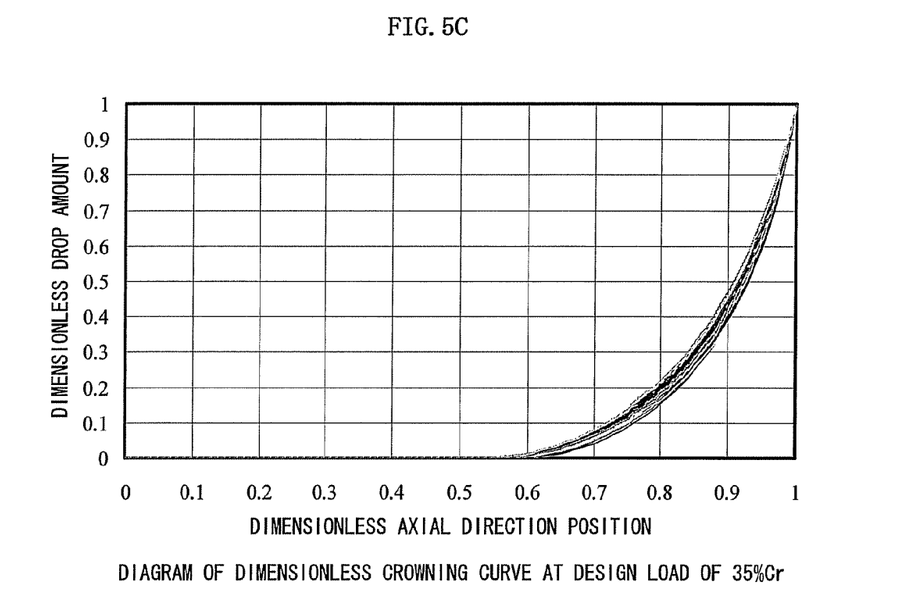
FIG. 5C is a diagram of optimization results of a crowning profile when the design load is 35% of the basic dynamic load rating.
Figure 5D:
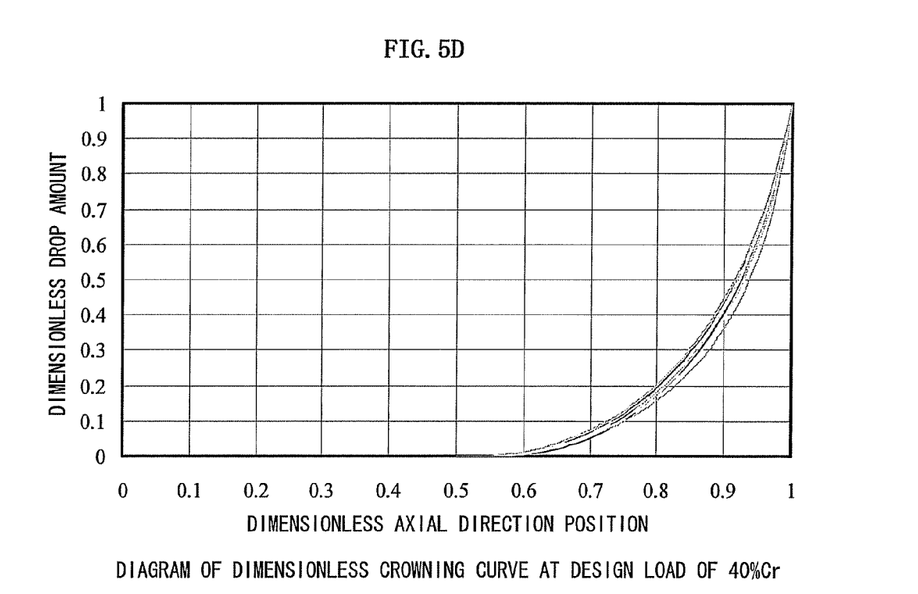
FIG. 5D is a diagram of optimization results of a crowning profile when the design load is 40% of the basic dynamic load rating.
Figure 5E:
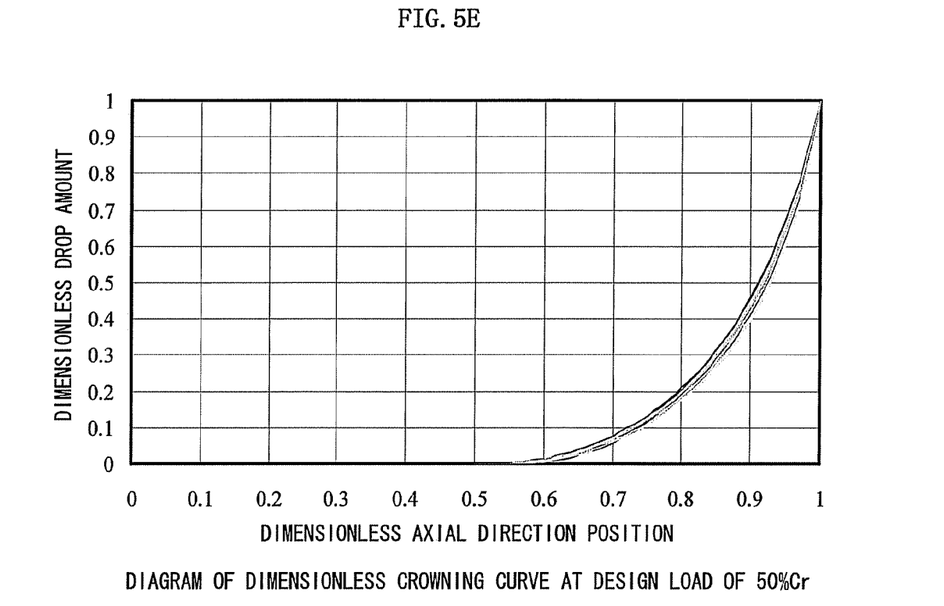
FIG. 5E is a diagram of optimization results of a crowning profile when the design load is 50% of the basic dynamic load rating.

FIG. 4 is a diagram showing the above-described Expression (12) and Expression (13) superimposed on a coordinate system. In FIG. 4, the horizontal axis indicates a percentage x [%] in relation to the basic dynamic load rating of the design load. The vertical axis is a and b. When Expression (7) to Expression (11) are generalized using Expression (12) and Expression (13), above, a following Expression (14) is obtained.

[Expression 14]

$$z_m = (0.0051x + 0.2721) \cdot (d+L) + (0.0415x - 0.3443) \quad (14)$$

Using the above-described Expression (14), the optimal value of $z_m[\mu m]$ can be determined from d+L[mm] serving as the nominal dimension of the roller and the percentage x[%] of the design load.

Next, a table for identifying the overall profile of the crowning is created.

First, the results of the optimization calculation of the crowning curve are made dimensionless by the value of the bus-line direction position being divided by half of the effective length L. In addition, the value of the drop amount at each bus-line direction position is made dimensionless by being divided by the optimal value $z_m$ of the drop amount at the end of the effective length. FIG. 5A to FIG. 5E are diagrams showing the crowning curve after being made dimensionless, for each load condition. In FIG. 5A to FIG. 5E, the horizontal axis indicates dimensionless bus-line direction positions. The vertical line indicates dimensionless drop amounts. The position 0 in the dimensionless bus-line direction indicates the center of the roller.

FIG. 5A to FIG. 5E are diagrams in which the optimization results of the rollers having the 64 types of dimensions with a diameter of φ24 and below are shown in an overlapping manner. Aside from the design load, the design conditions are the same in each diagram. The design load is 25% Cr in FIG. 5A, 30% Cr in FIG. 5B, 35% Cr in FIG. 5C, 40% Cr in FIG. 5D, and 50% Cr in FIG. 5E.

Figure 6:
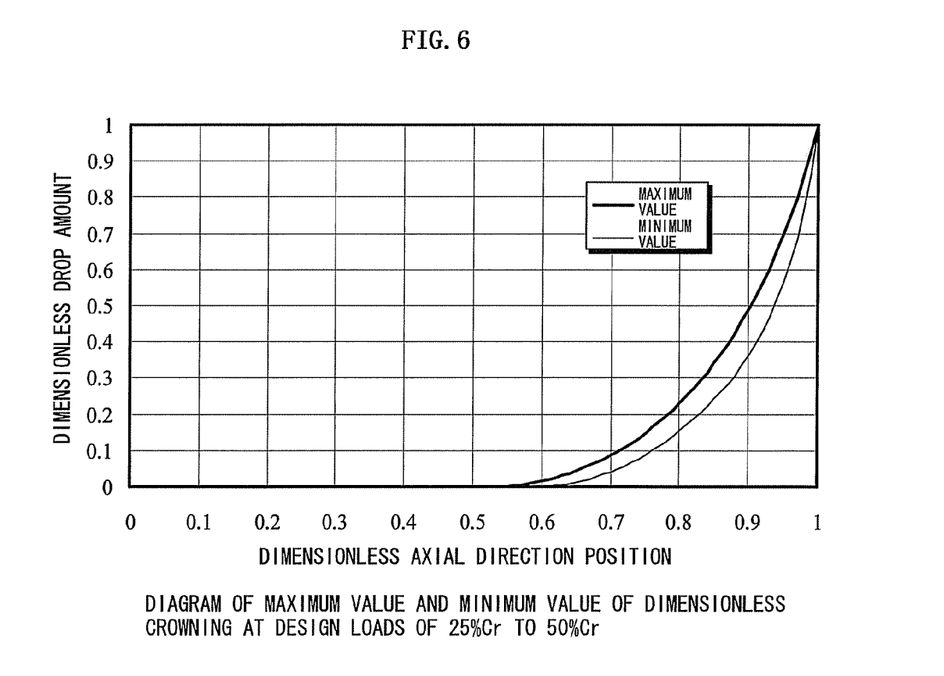
FIG. 6 is a diagram of curve indicating a maximum value and a curve indicating a minimum value, extracted from all crowning curves in FIG. 5A to FIG. 5E.

As is clear from FIG. 5A to FIG. 5E, when shown in a dimensionless state, the crowning curves under all load conditions indicate a similar profile. FIG. 6 is a diagram showing the curve indicating the maximum value and the curve indicating the minimum value, extracted from all crowning curves in FIG. 5A to FIG. 5E. As is clear from FIG. 6, regardless of the roller dimensions and the load conditions, the crowning can be designed by the dimensionless curve being determined from a relatively narrow range.

Figure 7:
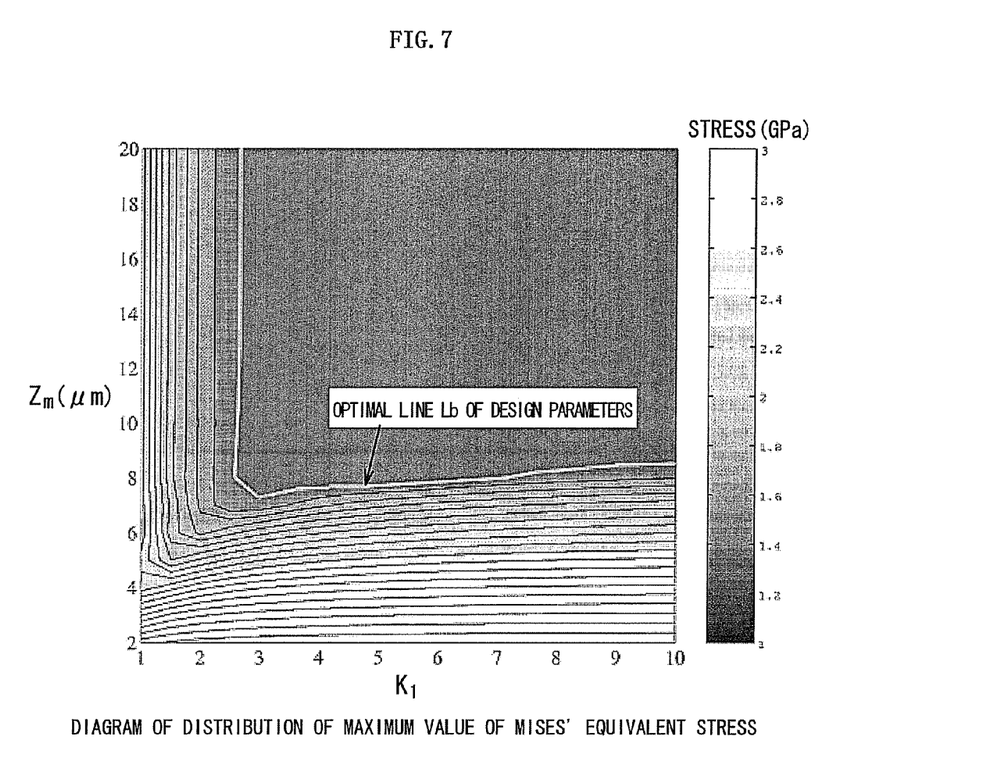
FIG. 7 is a diagram of distribution of a maximum value of Mises' equivalent stress with $K_1$ and $z_m$ as parameters.

FIG. 7 is a diagram showing a distribution of the maximum values of Mises' equivalent stress that is the objective function of the optimization calculation, with $K_1$ and $z_m$ as parameters. As is clear from FIG. 7, the value of the parameter $K_1$ is preferably made greater than an optimization line Lb (indicated by the white line) because the maximum value of Mises' equivalent stress tends to decrease. Here, when the parameter $K_1$ increases, the curvature of the crowning curve decreases. Therefore, when the crowning curve applicable to a wide range of conditions is selected from a range between the maximum value and the minimum value of the curve shown in FIG. 6, a curve in which the drop amount is the maximum value at all bus-line direction positions is preferably selected. Points on a curve such as this, when expressed by dimensionless amounts of the bus-line direction position and the drop amount, are as shown in Table 5, below.

TABLE 5

| Bus-line Direction Position (Dimensionless Amount) | Drop Amount (Dimensionless Amount) |
|---|---|
| 0-0.50 | 0 |
| 0.55 | 0.002 |
| 0.60 | 0.015 |
| 0.65 | 0.043 |
| 0.70 | 0.086 |
| 0.75 | 0.147 |
| 0.80 | 0.229 |
| 0.85 | 0.340 |
| 0.90 | 0.489 |
| 0.95 | 0.696 |
| 1.00 | 1.000 |

In Table 5, above, the profile of the overall crowning can be determined through application of the drop amount $z_m$ determined by Equation (14), above. In other words, the dimensionless amount in the bus-line direction position column is multiplied by a value of L/2, which is half of the effective length of the roller. The dimensionless amount in the drop amount column is multiplied by the drop amount $z_m$. As a result, a point on the y-z coordinate system formed by the bus-line direction of the roller (y axis) and the direction perpendicular to the bus line (z axis) can be identified. The crowning curve can be determined by a curve passing through this point being set.

In the roller bearing and the method of designing the crowning according to the embodiment, optimization calculation of the crowning curve is not required to be performed every time design is performed. Therefore, unlike the conventional roller bearing and design method, a large amount of calculation is not required for the possible conditions of the design parameters. Therefore, labor and time required for designing the crowning can be effectively reduced.

According to the embodiment, under a high load, the $z_m$ is preferably large in terms of effectiveness in preventing edge load. However, when the drop amount $z_m$ is made unnecessarily large, amount of processing required during crowning manufacturing increases, resulting in increased costs. Moreover, under most actual usage conditions, the load is 25% of the basic dynamic load rating or less, and rarely exceeds 35%. Therefore, in Expression (14), x is preferably 25 or more and 35 or less.

Next, a method of inspecting a product after manufacturing, regarding the roller bearing according to the embodiment, will be described.

In the roller bearing according to the embodiment, the optimal value $z_m[\mu m]$ of the drop amount at the end of the effective length of the roller is designed using Expression (15), below, from the diameter d[mm] of the roller and the effective length L[mm] of the roller.

[Expression 15]

$$0.40(d+L)+0.66 \leq z_m \leq 0.46(d+L)+1.03 \quad (15)$$

Expression (15) is determined as described below. In other words, under the actual usage conditions of the roller bearing, the percentage x of the design load in relation to the basic dynamic load rating rarely exceeds 35%. On the other hand, when the percentage of the design load is lower than 25%, prevention of the edge load becomes insufficient. Therefore, when, in Expression (14), the drop amount of the crowning at the end of the effective length of the roller of the product satisfies a condition in that the value of x is 25 or more and 35 or less, the drop amount is appropriate for actual usage conditions. In other words, when the optimal value $z_m$[μm] of the drop amount at the end of the effective length of the roller, the diameter d[mm] of the roller, and the effective length L[mm] of the roller satisfy Expression (15), a crowning having these values is judged to be suitable for actual use.

A bus-line direction position of the crowning of the product is selected. The drop amount at the selected position is measured. Whether the drop amount is within a predetermined tolerance range is judged.

As is clear from Expression (6), the crowning curve is determined by the three design parameters $K_1$, $K_2$, and $z_m$. Therefore, when the drop amount of the crowning of the product is selected and inspection is performed, selection of three points is considered sufficient. In this instance, points that directly express the design parameters are selected when possible. Two points, an intersection between the crowning section and a chamfer that determines $z_m$, and an intersection between the straight section and the crowning section that determines $K_2$, are easily selected. On the other hand, because $K_1$ does not indicate a specific point on the crowning, another representative point is required to be selected. As an example of another representative point, a point at which the drop amount is half of $z_m$ can be selected.

Because the selected points are measured during an inspection process performed on the production line of the roller bearing, the points are required to be easily measured. On the raceways or the rolling contact surface, the drop amount is roughly zero over a relatively wide range in the bus-line direction near the intersection between the straight section and the crowning section. Therefore, when design tolerance is provided for the drop amount at the intersection between the straight section and the crowning section, a very small range of tolerance is expected. Therefore, as an alternative point, a point at which the drop amount is about 1/10 of $z_m$ is preferably used.

The bus-line direction position and the drop amount to be measured can be precisely determined from Table 5, above However, points such as those in Table 6, below, are preferably measured taking into consideration error that will be present in the actual product and ease of measurement.

TABLE 6

| Bus-line Direction Position (Dimensionless Amount) | Drop Amount (Dimensionless Amount) |
|---|---|
| 0.7 | 0.1 |
| 0.9 | 0.5 |
| 1.0 | 1.0 |

In Table 6, the value of the bus-line position is a value made dimensionless by a value (L/2) that is half of the effective length of the roller. The value of the drop amount is a value made dimensionless by the optimal value $z_m$ of the drop amount at the end of the effective length of the roller.

Here, optimization calculation is performed regarding three specific types of roller bearings, and the tolerance for the drop amount is studied. Following types are selected as the bearings on which the calculation is performed.

Bearing A: a ratio of diameter and length of the roller is close to 1:1, and a roller diameter is small Bearing B: a ratio of diameter and length of the roller is close to 1:1, and a roller diameter is large Bearing C: a ratio of diameter and length of the roller is large, and a roller diameter is equivalent to that of bearing B Bearing model numbers are, for example, NU304E for bearing A, NU312E for bearing B, and NU2312E for bearing C.

Regarding the rollers in bearing A to bearing C, when a rate of increase in the maximum value of Mises' equivalent stress is calculated when an error is given to the dimensionless axial direction positions in Table 6, results such as those shown in Table 7 to Table 9, below, are obtained. The calculation is performed based on a crowning profile of a crowning curve precisely designed through optimization calculation. On the other hand, a crowning profile in which the error is taken into consideration is a simple curve obtained by interpolation between each point in Table 6 using a natural spline curve. Therefore, even when the error at each point is 0, although the profile does not significantly differ from the optimal profile, the profiles do not precisely match. As a result, the rate of increase in the equivalent stress in Table 7 to Table 9 does not become zero.

TABLE 7

| | a | | | | |
|---|---|---|---|---|---|
| b | −1 | ±0 | +1 | +2 | +3 |
| Drop Amount Error of −0.4 μm at Bus-line Direction Position 0.7 | | | | | |
| −2 | 55.6 | 70.7 | 85.7 | 100.3 | 114.3 |
| 0 | 12.3 | 6.9 | 22.5 | 37.8 | 52.5 |
| +2 | 20.7 | 10.8 | 5.9 | 10.7 | 15.4 |
| +4 | 27.8 | 18.9 | 10.1 | 8.7 | 13.4 |
| +6 | 35.0 | 25.8 | 16.8 | 9.9 | 11.2 |
| +8 | 42.0 | 32.7 | 23.8 | 14.9 | 9.9 |
| Drop Amount Error of ±0 μm at Bus-line Direction Position 0.7 | | | | | |
| −2 | 59.7 | 71.8 | 86.6 | 101.1 | 115.1 |
| ±0 | 14.2 | 8.9 | 23.7 | 38.9 | 53.6 |
| +2 | 22.3 | 12.5 | 4.1 | 7.7 | 13.2 |
| +4 | 29.6 | 20.6 | 10.8 | 4.5 | 10.7 |
| +6 | 36.8 | 27.5 | 18.5 | 9.4 | 7.3 |
| +8 | 43.8 | 34.5 | 25.4 | 16.4 | 8.9 |
| Drop Amount Error of +0.5 μm at Bus-line Direction Position 0.7 | | | | | |
| −2 | 67.8 | 74.6 | 88.3 | 102.5 | 116.4 |
| ±0 | 16.7 | 17.4 | 26.2 | 40.8 | 55.1 |
| +2 | 24.5 | 14.7 | 4.7 | 2.9 | 10.0 |
| +4 | 31.8 | 22.6 | 12.9 | 3.9 | 6.4 |
| +6 | 39.0 | 29.7 | 20.7 | 11.1 | 3.8 |
| +8 | 46.1 | 36.7 | 27.5 | 18.5 | 9.4 |
| Drop Amount Error of +1 μm at Bus-line Direction Position 0.7 | | | | | |
| −2 | 75.8 | 82.0 | 90.9 | 104.4 | 118.0 |
| ±0 | 20.3 | 26.6 | 32.1 | 43.4 | 57.1 |
| +2 | 26.6 | 17.0 | 6.8 | −1.8 | 6.2 |
| +4 | 34.1 | 24.7 | 15.1 | 5.3 | 0.9 |
| +6 | 41.3 | 31.9 | 22.8 | 13.1 | 4.0 |
| +8 | 48.4 | 39.0 | 29.7 | 20.7 | 11.2 |

Table 7 shows the errors in the drop amount and the rates of increase [%] of the maximum value of Mises' equivalent stress in the bearing A.

TABLE 8

| b | a -2 | ±0 | +2 | +4 | +6 |
|---|---|---|---|---|---|
| Drop Amount Error of −0.75 μm at Bus-line Direction Position 0.7 ||||||
| −4 | 57.0 | 73.0 | 88.8 | 104.0 | 118.6 |
| ±0 | 14.3 | 6.7 | 23.1 | 39.1 | 54.3 |
| +4 | 22.7 | 12.4 | 5.7 | 10.7 | 15.7 |
| +8 | 30.7 | 20.8 | 11.2 | 8.6 | 13.6 |
| +12 | 38.5 | 28.4 | 18.8 | 10.8 | 11.3 |
| +16 | 46.1 | 35.9 | 26.0 | 16.7 | 10.7 |
| Drop Amount Error of ±0 μm at Bus-line Direction Position 0.7 ||||||
| −4 | 62.0 | 74.1 | 89.7 | 104.8 | 119.4 |
| ±0 | 16.3 | 8.9 | 24.3 | 40.2 | 55.3 |
| +4 | 24.4 | 14.2 | 4.7 | 7.6 | 13.4 |
| +8 | 32.5 | 22.4 | 12.3 | 5.0 | 10.8 |
| +12 | 40.3 | 30.2 | 20.4 | 10.5 | 7.2 |
| +16 | 47.9 | 37.7 | 27.7 | 18.3 | 9.7 |
| Drop Amount Error of +0.75 μm at Bus-line Direction Position 0.7 ||||||
| −4 | 68.4 | 76.1 | 90.9 | 105.9 | 120.3 |
| ±0 | 18.2 | 16.0 | 26.1 | 41.5 | 56.5 |
| +4 | 26.2 | 16.1 | 5.2 | 3.8 | 10.9 |
| +8 | 34.3 | 24.1 | 14.0 | 4.5 | 7.4 |
| +12 | 42.2 | 32.0 | 22.0 | 12.0 | 4.4 |
| +16 | 49.8 | 39.6 | 29.5 | 19.9 | 10.1 |
| Drop Amount Error of +1.5 μm at Bus-line Direction Position 0.7 ||||||
| −4 | 74.6 | 81.3 | 92.6 | 107.1 | 121.4 |
| ±0 | 20.0 | 23.1 | 29.5 | 43.1 | 57.8 |
| +4 | 28.1 | 17.9 | 6.9 | −1.4 | 8.0 |
| +8 | 36.2 | 25.9 | 15.8 | 5.4 | 3.4 |
| +12 | 44.1 | 33.8 | 23.7 | 13.6 | 4.2 |
| +16 | 51.6 | 41.4 | 31.2 | 21.5 | 11.5 |

Table 8 shows the errors in the drop amount and the rates of increase [%] of the maximum value of Mises' equivalent stress in the bearing B.

TABLE 9

| b | a −3 | ±0 | +3 | +6 | +9 |
|---|---|---|---|---|---|
| Drop Amount Error of −1 μm at Bus-line Direction Position 0.7 ||||||
| −5 | 56.0 | 74.9 | 93.3 | 111.0 | 128.2 |
| ±0 | 12.8 | 11.7 | 33.9 | 55.0 | 75.1 |
| +5 | 20.3 | 9.5 | 7.1 | 12.7 | 17.7 |
| +10 | 27.7 | 16.2 | 7.9 | 10.7 | 15.7 |
| +15 | 34.7 | 23.2 | 12.5 | 8.1 | 13.6 |
| +20 | 41.5 | 30.2 | 19.0 | 10.3 | 11.1 |
| Drop Amount Error of ±0 μm at Bus-line Direction Position 0.7 ||||||
| −5 | 64.4 | 76.5 | 94.5 | 112.0 | 129.2 |
| ±0 | 14.5 | 14.8 | 35.4 | 56.2 | 76.3 |
| +5 | 22.1 | 10.9 | 2.4 | 10.2 | 15.8 |

TABLE 9-continued

| b | a −3 | ±0 | +3 | +6 | +9 |
|---|---|---|---|---|---|
| +10 | 29.5 | 17.9 | 7.8 | 7.2 | 13.6 |
| +15 | 36.6 | 25.0 | 13.9 | 5.9 | 11.0 |
| +20 | 43.3 | 32.0 | 20.7 | 10.6 | 7.5 |
| Drop Amount Error of +1 μm at Bus-line Direction Position 0.7 ||||||
| −5 | 73.3 | 79.4 | 96.1 | 113.3 | 130.3 |
| ±0 | 18.3 | 24.4 | 37.8 | 57.8 | 77.6 |
| +5 | 24.0 | 12.3 | 1.8 | 7.1 | 13.7 |
| +10 | 31.4 | 19.6 | 9.1 | 2.3 | 11.2 |
| +15 | 38.4 | 26.8 | 15.5 | 5.6 | 7.6 |
| +20 | 45.1 | 33.7 | 22.3 | 11.8 | 3.8 |
| Drop Amount Error of +2 μm at Bus-line Direction Position 0.7 ||||||
| −5 | 82.1 | 86.3 | 98.3 | 114.9 | 131.6 |
| ±0 | 28.1 | 34.7 | 41.7 | 59.9 | 79.2 |
| +5 | 25.9 | 14.0 | 2.8 | 3.0 | 11.4 |
| +10 | 33.3 | 21.4 | 10.4 | 0.2 | 8.1 |
| +15 | 40.3 | 28.6 | 17.1 | 6.9 | 3.0 |
| +20 | 47.0 | 35.6 | 24.1 | 13.1 | 3.5 |

Table 9 shows the errors in the drop amount and the rates of increase [%] of the maximum value of Mises' equivalent stress in the bearing C.

In Table 7 to Table 9, a is the error in the drop amount at a bus-line direction position 0.9, and b is the error in the drop amount at a bus-line direction position 1.0.

From Table 7 to Table 9, when the rate of increase in the equivalent stress of up to 20% is allowed to achieve a tolerance that is permissible in mass production, a tolerance such as that shown in Table 10, below, is set for each bearing A to bearing C.

TABLE 10

| | | Bearing A | Bearing B | Bearing C |
|---|---|---|---|---|
| Drop Amount Tolerance (μm) | Bus-line Direction Position 0.7 | 0 | 0 | +2 |
| | | −0.4 | −0.75 | −1 |
| | Bus-line Direction Position 0.9 | +3 | +6 | +9 |
| | | +1 | +2 | +3 |
| | Bus-line Direction Position 1.0 | +6 | +8 | +15 |
| | | +2 | +4 | +5 |

Table 10 shows the tolerances of when the rate of increase in Mises' equivalent stress of up to 20% is allowed.

When the tolerances are made dimensionless by being divided by the optimal value $z_m$ of the drop amount at the end of the effective length in each roller, tolerances such as those shown in Table 11, below, are obtained.

TABLE 11

| | | | Bearing A | | Bearing B | | Bearing C | |
|---|---|---|---|---|---|---|---|---|
| Dimensionless Drop Amount (Left Column) | Tolerance (Right Column) | Bus-line Direction Position 0.7 | 0.06 | 0 | 0.05 | 0 | 0.07 | +0.10 |
| | | | | −0.05 | | −0.05 | | −0.05 |
| | | Bus-line Direction Position 0.9 | 0.42 | +0.38 | 0.40 | +0.41 | 0.43 | +0.45 |
| | | | | +0.13 | | +0.14 | | +0.15 |
| | | Bus-line Direction Position 1.0 | 1 | +0.75 | 1 | +0.54 | 1 | +0.75 |
| | | | | +0.25 | | +0.27 | | +0.25 |

Table 11 shows tolerances with the drop amounts made dimensionless using the optimal value $z_m$ of the drop amount at the end of the effective length.

As is clear from Table 11, regardless of the dimensions of the bearing, a similar degree of tolerance is permitted at each bus-line direction position.

From the above, the tolerance (allowable range) of the crowning curve can be set as shown in Table 12, below, using rough values regardless of the dimensions of the bearing.

TABLE 12

| Bus line Direction Position (Dimensionless Amount) | Allowable Range of Drop Amount (Dimensionless Amount) |
|---|---|
| 0.7 | 0~0.1 |
| 0.9 | 0.6~0.8 |
| 1.0 | 1.25~1.75 |

Table 12 shows the tolerance of the crowning curve.

Whether the crowning of the product is within the range of the tolerance is judged with reference to Table 12 that has been obtained as described above. In other words, regarding the crowning of the product, positions equivalent to the three dimensionless bus-line direction positions in Table 12 are selected. The drop amounts at these positions are measured. The dimensionless amounts of the drop amounts are calculated. When the dimensionless drop amounts are within the allowable range in Table 12, the dimensions of the crowning can be judged to be within the tolerance range. The description above pertains to a crowning of which the bus-line direction position is on a positive side. However, because the crownings in the cylindrical roller are horizontally symmetrical, the crowning can be similarly inspected when the bus-line direction position is in the negative area.

In this way, in the roller bearing of the present invention, when the product is inspected, unlike the conventional method, there is no need for the crowning profile to be measured, the design parameters to be calculated, and judgment to be made regarding whether the design parameters are within the tolerance range. Therefore, the crowning can be more easily inspected.

According to the embodiment, the crowning can be provided on any of the rolling contact surface of the roller, and the outer ring raceway or the inner ring raceway. When the crownings are provided on both the rolling contact surface of the roller and the outer ring raceway or the inner ring raceway, the crowning curve formed on each surface can be determined by the drop amount in each of the above-described bus-line direction positions being distributed to the rolling contact surface side and the raceway side. During inspection of the roller bearing product, a sum of the drop amount of the crowning on the rolling contact surface side and the drop amount of the crowning on the raceway side is calculated. Whether the value of the sum satisfies the condition in Table 12 is judged.

In Table 5 showing the dimensionless amounts of the bus-line direction position and the drop amount, the bus-line direction positions are indicated in 0.05 units. However, a specified interval of the bus-line direction position can be a value other than 0.05.

Figure 8:
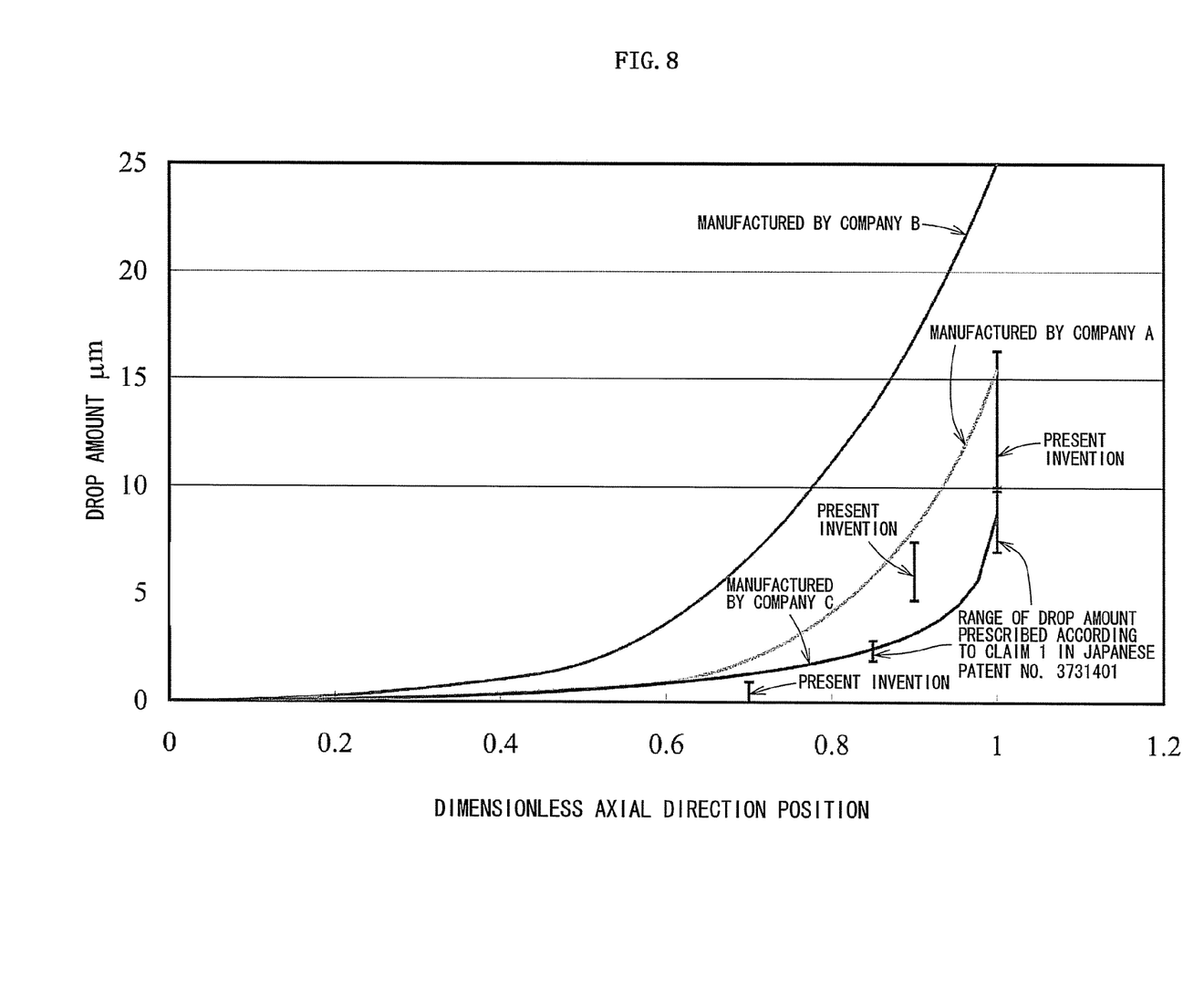
FIG. 8 is a graph comparing drop amounts of the crowning in the present invention and drop amounts of crownings in conventional products manufactured by other companies.

Finally, FIG. 8 shows a comparison between the drop amount of the crowning in the present invention and the drop amount of the crowning in a conventional product by another company (roller bearings by company A, company B, and company C). In FIG. 8, the horizontal axis indicates a dimensionless axial direction (bus-line direction) position. The vertical axis indicates the drop amount (μm). The dimensionless axial direction position 0 indicates a center of the roller. As is clear from FIG. 8, the drop amounts of the crowning in the present invention (dimensionless axial direction positions=0.7, 0.9, and 1.0) is clearly different from the drop amounts of all crownings in the conventional products. A range of the drop amount prescribed in Claim 1 of Patent Document 2 (Japanese Patent Publication No. 3731401) is also shown in accompaniment.

The invention claimed is:

1. A roller bearing comprising:
   an inner ring having an inner ring raceway;
   an outer ring having an outer ring raceway; and
   a plurality of rollers interposed between the inner ring raceway and the outer ring raceway,
   wherein a crowning is formed on at least one of the inner ring raceway, the outer ring raceway, and a roller rolling contact surface,
   wherein a value zm[μm] of a drop amount of the crowning at an end of an effective length is determined from a diameter d[mm] of a roller and an effective length L[mm] of the roller using the following expression:

$$0.40(d+L)+0.66 \leq zm \leq 0.46(d+L)+1.03$$

wherein drop amounts of the crowning at a plurality of positions in a bus-line direction of the crowning are within an allowable range described in Table 1, with a center of the effective length of the roller being a point of origin, a bus-line direction position being made dimensionless by being divided by L/2, and the drop amount of the crowning being made dimensionless by being divided by zm.

* * * * *